United States Patent
Hoover et al.

(10) Patent No.: US 8,773,473 B2
(45) Date of Patent: Jul. 8, 2014

(54) INSTANTANEOUS PANNING USING A GROOVE METAPHOR

(75) Inventors: Paul Armistead Hoover, Bothel, WA (US); Michael Patten, Sammamish, WA (US); Maxim V. Mazeev, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 702 days.

(21) Appl. No.: 12/955,034

(22) Filed: Nov. 29, 2010

(65) Prior Publication Data

US 2012/0133680 A1 May 31, 2012

(51) Int. Cl.
*G09G 5/40* (2006.01)
*G09G 5/02* (2006.01)

(52) U.S. Cl.
USPC .......................................... 345/677

(58) Field of Classification Search
USPC .......................................... 345/677
See application file for complete search history.

(56) References Cited

U.S. PATENT DOCUMENTS

| | | | |
|---|---|---|---|
| 4,812,833 A | 3/1989 | Shimauchi | |
| 7,129,933 B1 | 10/2006 | Nishikawa et al. | |
| 7,868,919 B2 * | 1/2011 | Flannery | 348/211.8 |
| 7,873,470 B2 * | 1/2011 | Baba et al. | 701/457 |
| 8,230,358 B1 * | 7/2012 | Chaudhri | 715/773 |
| 2005/0289452 A1 * | 12/2005 | Kashi et al. | 715/512 |
| 2006/0001652 A1 | 1/2006 | Chiu et al. | |
| 2006/0028446 A1 | 2/2006 | Liberty et al. | |
| 2006/0250393 A1 * | 11/2006 | Tsang et al. | 345/420 |
| 2008/0036771 A1 * | 2/2008 | Bae | 345/442 |
| 2008/0224995 A1 * | 9/2008 | Perkunder | 345/157 |
| 2009/0249243 A1 * | 10/2009 | Bisalputra et al. | 715/781 |
| 2010/0017758 A1 * | 1/2010 | Zotov et al. | 715/863 |
| 2010/0149134 A1 | 6/2010 | Westerman et al. | |
| 2010/0231534 A1 | 9/2010 | Chaudhri et al. | |
| 2010/0265196 A1 | 10/2010 | Lee et al. | |
| 2011/0234522 A1 * | 9/2011 | Lin et al. | 345/173 |
| 2012/0030568 A1 * | 2/2012 | Migos et al. | 715/702 |
| 2012/0274587 A1 * | 11/2012 | Matsuoka | 345/173 |

FOREIGN PATENT DOCUMENTS

WO    2009109014 A1    9/2009

OTHER PUBLICATIONS

"International Search Report", Mailed Date: May 22, 2012, Application No. PCT/US2011/059946, Filed Date: Nov. 9, 2011, pp. 8.

* cited by examiner

*Primary Examiner* — Javid A Amini

(74) *Attorney, Agent, or Firm* — Sung Kim; Andrew Sanders; Micky Minhas

(57) ABSTRACT

User input interpretation mechanisms can pass along user input without delay by initially treating it as freeform movement and passing it along unmodified, rather than waiting to receive a sufficient quantity of user input from which to derive a user's intentions. User input within a defined range from an initial point is freeform movement, passed along unmodified, while user input beyond that range can be confined to a groove if it evidences an intention to move in a precisely linear manner. Grooves can be established to aid in precise vertical movement, with no horizontal deviations, precise horizontal movement, with no vertical deviations, or any other orientation. Before being passed along, user input in groove regions can be modified to center the input within the groove region and eliminate human inaccuracies, such as slight deviations to either side. User input can escape groove regions by moving orthogonally to them.

20 Claims, 5 Drawing Sheets

INSTANTANEOUS PANNING USING A GROOVE METAPHOR

BACKGROUND

Modern computing devices can enable a user to provide input through a variety of physical input devices, many of which depart from the traditional keyboard-and-mouse metaphor. For example, modern computing devices can comprise a touchscreen, tablet, trackpad or other like physical-press-based input peripheral. As another example, some modern computing devices can comprise an image capture peripheral, such as a video camera or a still-frame camera, that can capture a user's movements and, thereby, enable the computing device to translate those movements into user input.

The processes executing on such modern computing devices, however, may not necessarily be optimized for receiving input through such a variety of input peripherals. For example, the user interface presented by many applications, operating systems, components, or other collections of computer-executable instructions, can make extensive use of the ubiquitous click-and-drag metaphor that can be difficult to implement using certain input peripherals. Consequently, computing devices that receive user input through alternative input peripherals, such as a touchscreen, have implemented interpretational mechanisms that seek to aid the user by first identifying what the user is attempting to accomplish and only then pass along the user's input, often in a modified manner, to the application programs, operating systems and other computer-executable instructions executing on such computing devices. Such interpretation mechanisms result in a delay that can be disconcerting to users.

One example of such a delay is in the context of panning, or moving a graphical user interface element that is displayed to the user. In such a case, existing interpretation mechanisms will delay in passing along the user's input to application programs until the interpretation mechanisms can determine whether the user wants to perform an activation, pan in a free-form manner, or whether the user wants to pan linearly, such as straight up-and-down or straight left-and-right. Thus, when a user utilizes a computing device with, for example, a touchscreen, presses down on the touchscreen, such as with their finger, and begins to move their finger, the interpretation mechanisms will wait until the user's finger has moved a sufficient distance before passing along any of the user's input to an application program or the operating system. Only after a user's finger has moved a sufficient distance can the existing interpretation mechanisms intelligently determine whether the user is attempting to perform an activation, pan in a freeform manner, or whether, even though the user's finger is not moving precisely in a straight line, the user seeks to pan linearly. If the interpretation mechanisms determine that the user is attempting to pan linearly, the user input that they provide, such as to application programs executing on that computing device, can be user input that indicates a perfectly linear pan even if the user's finger is not moving precisely in a straight line. However, from the perspective of the user, their finger will have moved at least some distance before there is any movement at all of the corresponding graphical user interface element. As indicated, such a delay can be disconcerting.

SUMMARY

In one embodiment, user input interpretation mechanisms can pass along a user's input, as freeform movement, without delay. Subsequently, if the user input interpretation mechanisms determine, based on continuing user input, that the user is attempting linear movement, the user input interpretation mechanisms can transition to passing along that user input as linear movement, as opposed to freeform movement, and can constrain the user input that is passed along to a "groove" oriented in the direction of the linear movement intended by the user, as interpreted by the user input interpretation mechanisms.

In another embodiment, user input interpretation mechanisms can interpret a user's input as freeform movement so long as the user's input does not extend beyond a threshold surrounding the initial point at which the user's input was first received. If the user's input proceeds to travel beyond such a threshold, the user input interpretation mechanisms can establish defined regions within which the user's input will still be interpreted as freeform movement. Similarly, beyond such a threshold, the user input interpretation mechanisms can likewise establish "groove" regions that are linearly oriented and within which the user's input will be interpreted as intending to be linear movement and will be passed along in a like manner.

In a further embodiment, once the user input interpretation mechanisms have interpreted the user's input as intending to be linear movement, such an interpretation can be deactivated if the user's input moves orthogonally to the direction of the preceding linear movement beyond a threshold distance. In such a case, the user's input can again be interpreted as freeform movement within a region surrounding the location of the user's input at that time. If the user's input moves beyond that region the user's input can, again, be interpreted in light of pre-established regions of freeform movement and pre-established groove regions of linear movement.

In a still further embodiment, when transitioning between an interpretation of the user's input as freeform movement and an interpretation of the user's input as being constrained to linear movement, the groove to which the user's input is linearly constrained can be aligned with the initial point at which the user's input was first received, and the user input that is passed along can be "snapped back" to such a groove from its current location, or the groove to which the user's input is linearly constrained can be aligned with the current location of the user's input. Similarly, if the user provided input for only a short period of time, or if the user's input did not move beyond an activation threshold, a determination can be made that the user did not intend to move anything and instead intended to perform an activation event, such as could be analogous to the ubiquitous "mouse click". In such a case, any movement that was passed along by the user input interpretation mechanisms can be undone. While such an action can cause visual user interface elements that were never intended, by the user, to be moved to, in fact, move slightly and then return to their original location, such activity can actually be beneficial because it can provide a visual suggestion to the user that the element can, in fact, be moved.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
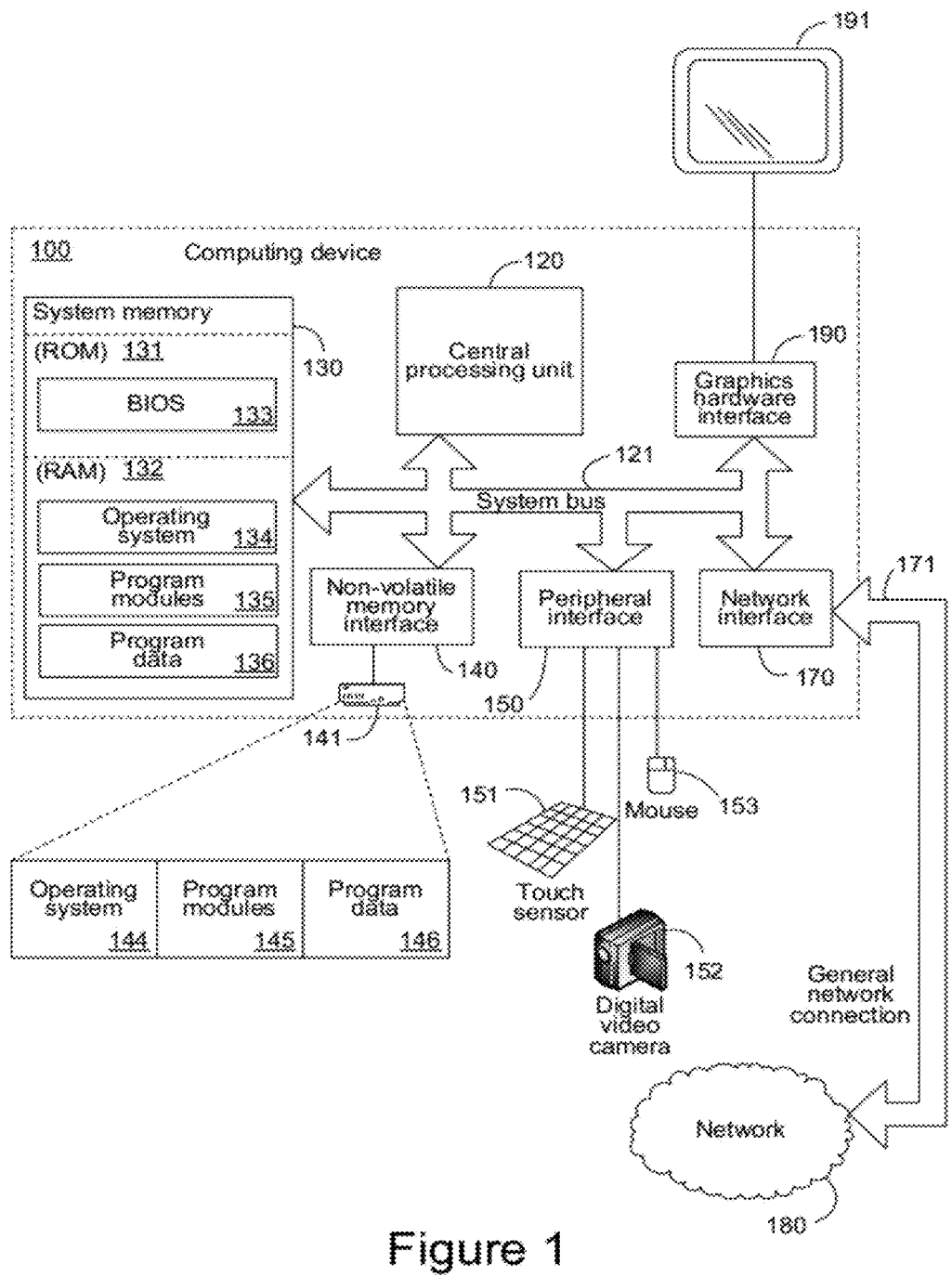
FIG. 1 is a block diagram of an exemplary computing device.

The following description relates to the interpretation of input received from a user in the context of panning or moving one or more graphical user interface elements that are being displayed to the user. Upon the receipt of an initial user input event, user input interpretation mechanisms can interpret any movement as freeform movement and can feed-through such user input without delay to application programs or other computer-executable instructions to which such user input is to be directed. If user input does not proceed beyond an activation threshold, the user input interpretation mechanisms can interpret the user's input as an activation and can "undo" any small movements they may have passed along, such as by automatically generating input to return to the location of the original input event. If movement of the user input proceeds beyond a freeform threshold, the user input interpretation mechanisms can interpret that movement as either freeform movement or, alternatively, as linear movement based on "groove" regions that extend in a linear manner from the location of the initial user input event and enable the user to easily provide input in a linear direction, such as straight up-and-down. Regions outside of the groove regions can remain freeform regions. If the user input is determined to be in a groove region, the user input interpretation mechanisms can restrict that user input to the linear orientation of the groove region and pass through linear user input even though the actual user input itself can be rather imprecise. Orthogonal motion to the direction of the groove can then release the user input from such a groove and can restart freeform movement. In such a manner, a user's input can be passed along, by user input interpretation mechanisms, without any interpretational delay, but such input can also benefit from interpretational aids, such as the constraining of the user's input to linear directions, through the groove regions.

For purposes of illustration, the techniques described herein are directed to a touch-based interface, such as would enable a user to provide input via one or more fingers, and to the context within which one or more user interface elements are moved or panned. Such references, however, are strictly exemplary and are not intended to limit the mechanisms described to the specific examples provided. Instead, such references were selected because they provide a conceptual framework that will be readily apparent to those skilled in the art and, as such, provide a useful framework for describing at least one embodiment of the interpretation mechanisms described. However, while reference is made to a touch-based interface, and specifically to a finger-activated touch-based interface, the mechanisms described are equally applicable, without modification, to other forms of user interface, including, for example, gesture interfaces or three-dimensional interfaces where, instead of touching a touchscreen, the user instead simply motions, such as with their hands, to provide the relevant input. Indeed, the techniques described are applicable to any user input, including input through more traditional interface peripherals, such as keyboards, mice, trackpads, pen-based peripherals and other like interfaces. Consequently, references below to a "touch", "press" or "release" are intended to be exemplary only and are intended to reference any like input in an associated interface. Similarly, while reference below is made to "panning" or "moving", such references are, again, meant to be exemplary only, as the mechanisms described are equally applicable to other user interaction, such as the provision of two-dimensional or three-dimensional directional input within the context of a video game. Consequently, the utilization of the terms "pan" and "move" is intended to be understood broadly to encompass equivalent user inputs.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary computing device 100 is illustrated upon which, and in conjunction with which, the below-described mechanisms can be implemented. The exemplary computing device 100 of FIG. 1 can include, but is not limited to, one or more central processing units (CPUs) 120, a system memory 130, that can include RAM 132, and a system bus 121 that couples various system components including the system memory to the processing unit 120. The system bus 121 may be any of several types of bus structures including a memory bus or memory controller, a peripheral bus, and a local bus using any of a variety of bus architectures. The computing device 100 can optionally include graphics hardware, such as for the display of visual user interfaces, including, but not limited to, a graphics hardware interface 190 and a display device 191. Additionally, the computing device 100 can also include user interface input hardware such as a mouse 153, digital video camera 152 and/or a touch sensor 151. The input hardware can be communicationally coupled to the system bus 121 via a peripheral interface 150. In some cases the input hardware may be co-located with other aspects of the computing device 100. For example, in a handheld or tablet configuration, the computing device 100 may comprise a display device 191 integrated with a touch sensor 151 such that the location of a touch on the touch sensor 151 can be correlated with one or more graphical user interface elements that may be displayed in the same location by the display device 191.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, solid state storage media or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and the aforementioned RAM 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates the operating system 134 along with other program modules 135, and program data 136.

The computing device 100 may also include other removable/non-removable, volatile/nonvolatile computer storage media. By way of example only, FIG. 1 illustrates the hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, other solid state storage devices and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

The computing device 100 can operate in a networked environment, represented by the network 180, using logical connections to one or more remote computers. The computing device 100 is illustrated as being connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Figure 2:
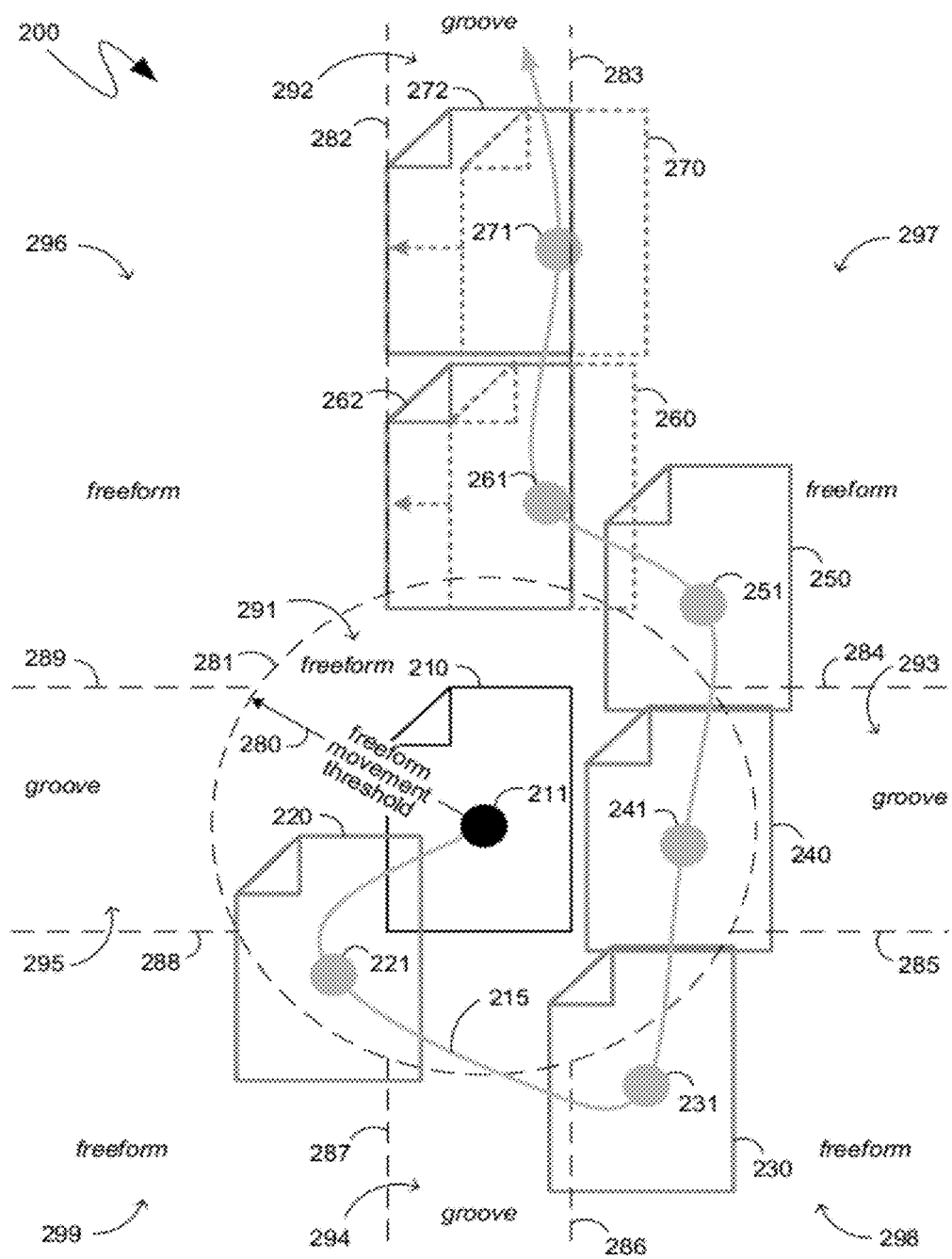
FIG. 2 is a block diagram of a visualization of an operation of an exemplary input interpretation mechanism.

Turning to FIG. 2, the system 200 shown therein illustrates an exemplary operation of user input interpretation mechanisms within the context of the movement of a graphical user interface element 210, shown as a traditional file icon, by a user utilizing a touchscreen device. Initially, if the user desires to move the file icon 210, the user could press down, such as with their finger, on the touchscreen device proximate to the file icon 210. The circle 211 represents the location of the user's input, such as can be generated by the user pressing down on the touchscreen device at the location represented by the circle 211. Likewise, the line 215 represents the subsequent movement of the user's input, such as can be generated by the user continuing to press down on the touchscreen device while moving their finger along the line 215.

In one embodiment, a region 291 can extend around the location 211 at which the user's input was first received and can define a region within which the user input interpretation mechanisms will pass the user's input through without delay, and will treat the user's input as freeform movement that does not require further editing, or modification. The freeform movement region 291 can be defined by a freeform movement threshold 280 that can extend from the location 211 at which the user's input was first received. Thus, as shown by the system 200 of FIG. 2, if the user were to, for example, press down with their finger onto a touchscreen device at the location 211 and then drag their finger along the line 215 to the location 221, the user input interpretation mechanisms can, in one embodiment, pass along such user input without delay to the application program, or operating system, responsible for the user interface element 210. As a result, such an application program, or operating system, can illustrate an outline, or grayed-out version of the icon 210, shown in the system 200 of FIG. 2 as the icon 220, to provide visual feedback, to the user, of the user's "dragging" of the icon 210.

For purposes of the descriptions herein, the grayed-out versions of the icon 210, such as the icon 220, illustrate the manner in which the interpretation mechanisms pass along the user's input, since such grayed-out versions can be generated as a direct product of the user input, as it is provided by the interpretation mechanisms. For example, in the particular example illustrated in the system 200 of FIG. 2, the user input interpretation mechanisms can pass along the user's input, in dragging from the location 211 to the location 221 along the line 215, without delay and without modification. Such passing along of the user's input in an unmodified manner is illustrated by the fact that the application program, or operating system, receiving such input has positioned the grayed-out icon 220 centered on the actual user input that was received by the user input interpretation mechanisms, such as at the location 221. As can be seen, the user input, in dragging from the location 211 to the location 221 along the line 215 can be interpreted, by the user input interpretation mechanisms, as freeform movement since all of the user's movement remains within the freeform area 291 described previously. As such, the user input can be passed along by the user input interpretation mechanisms without delay, since the user input interpretation of mechanisms do not wait for additional user input from which to attempt to derive the user's intentions and, instead, pass along the user's initial input, within the freeform movement threshold 280, in an unmodified manner and as freeform movement.

The user input interpretation mechanisms can continue to interpret the user's input as freeform movement so long as the user's input remains within regions associated with freeform movement. In one embodiment, regions associated with freeform movement can simply be those regions not otherwise defined.

Another type of region can be identified as a "groove" region because it can represent an orientation of motion within which a user may seek to move with specific, aided precision. For example, when moving one or more user interface elements up or down, a user will typically desire to move such interface elements exactly up or exactly down and avoid any deviation to the left or to the right. Thus, for example, if a user was reading a document, the user would seek to scroll the document straight up or straight down in order to continue reading, and any left or right motion could be distracting to the user's efforts to read the document. As another example, if the user were browsing a collection of images that was oriented horizontally, the user may seek to scroll to the next image by moving the relevant user interface elements exactly to the left or exactly to the right, and any up or down motion could, likewise, be distracting to the user's efforts to browse the collection of images. In these examples, vertical and horizontal movement of one or more user interface elements by the user can be aided by user input interpretation mechanisms applying a "groove" metaphor, whereby a user's input substantially directed along a particular direction, such as user input that is substantially vertical, can be thought of as falling into a groove that is aligned in a precisely vertical manner such that, even if the user's input was not perfectly vertical, and deviated slightly to either the left or the right, the user input that would be provided by the user input interpretation mechanisms could be modified, or corrected, to reflect a precisely vertical movement that the user could not, themselves, achieve without such aid.

In one embodiment, groove regions can be predetermined, such as, for example, by aligning such regions with the initial position of a user interface element. Thus, as shown in the system 200 of FIG. 2, groove regions 292, 293, 294 and 295 can be defined based on the initial location of the icon 210, or the initial point of the user's input at location 211. The remaining regions, in such an embodiment, namely the regions 296, 297, 298 and 299, can remain freeform regions. Additionally, in such an embodiment, when the user's input enters a groove region, the modification of such user input that can be applied by the user input interpretation mechanisms to align the passed through user input with the groove region can cause user interface elements affected by such user input to visually "jump" into the groove region.

By contrast, in another embodiment, the groove regions need not be predetermined, or can only be predetermined as to orientation, but not as to location. In such an embodiment, when the user's input evidences an intention to move in a precisely straight line, such as, for example, if the user input is trending in a substantially vertical manner, with the exception of slight human inaccuracies to the left or right, a groove region can be established at the location that the user's input, evidences an intention to move in the orientation of the groove region is located. In such an embodiment, modifications to the user input made by the user input interpretation mechanisms need not cause any sort of initial visual "jump" of affected user interface elements, but can, instead, simply straighten out subsequent user input in the orientation of the groove, once the groove region is established. Although not specifically illustrated in the Figures because of the temporal nature of such an embodiment, references to groove regions below are specifically intended to include both references to pre-established groove regions, such as those shown in the Figures, and to groove regions established dynamically based on historical user input.

Returning back to FIG. 2, when the user input continues along the line 215, such as by the user moving their finger on a touchscreen from the location 221 to the location 231, the user input can still be passed along in an unmodified manner because, despite the fact that the user input has left the freeform region 291, it has proceeded into the freeform region 298 and, as a result, can continue to be interpreted as freeform movement. The grayed-out icon 230, positioned centrally with the location 231 of the user input, illustrates that the user input is being passed along to the application program, or operating system, generating the grayed-out icon 230 in an unmodified manner, since the application program, or operating system, receives the user input, from the user input interpretation mechanisms, as being in the location 231, and, as a result, draws the grayed-out icon 230 in accordance with that user input location.

In a similar manner, as the user input continues to proceed along the line 215, from the location 231 to the location 241, it can continue to be interpreted as freeform movement because it can remain within freeform regions, namely, initially the freeform region 298, and subsequently back into the freeform region 291. The user input, therefore, can continue to be passed along by the user input interpretation mechanisms in an unmodified manner. Thus, as shown, the grayed-out icon 240 can be centered on the user input location 241 since the location 241 of the user input can be passed along by the user input interpretation mechanisms without change. Additionally, as the user input proceeds along the line 215 from the location 241 to the location 251, it can, likewise, continue to be interpreted as freeform movement because it remains within the freeform regions 291, and, subsequently, 297. As a result, the grayed-out icon 250 can be centered on the location of the user input 251 since such user input, as freeform input, is passed on, unmodified, to the application program, or operating system, responsible for drawing the grayed-out icon 250.

However, once the user input, continuing to proceed along the line 215, reaches the location 261, the user input interpretation mechanisms can determine that the user seeks to move the icon 210 in a precisely vertical manner, and, as a result, the user input interpretation mechanisms can modify the user input such that the user input that is passed along, by the interpretation mechanisms, can differ from the user input actually being provided on to, for example, the touchscreen. As shown in the system 200 of FIG. 2, user input at the location 261, if passed along by the user input interpretation mechanisms in an unmodified form, would traditionally cause a grayed-out icon to be presented as outlined by the icon outline 260. The actual grayed-out icon 262 displayed by the application program, or operating system, can be in a location deviated from that of the icon outline 260 such that the grayed-out icon 262 that is presented is precisely vertically aligned with the original position of the icon 210. From the perspective of the user, the provision of user input along the line 215 from the location 251 to the location 261 can, as the user input reaches the location 261, cause the resulting grayed-out icon to visually "jump" from the location 260 to the location illustrated by the grayed-out icon 262, thus making it appear as if the grayed-out icon fell into a groove that was vertically aligned with the original location of the icon 210.

To aid the user in moving user interface elements, such as the icon 210, in a precisely vertical, or precisely horizontal, manner, groove regions can be established directly above and below and precisely to the left and to the right of the original location of the icon 210. Thus, as illustrated in the system 200 of FIG. 2, a groove region 292 can extend directly above the icon 210 such that the groove region 292 is defined by boundaries 282 and 283 that can be extensions of the leftmost and rightmost boundaries of the icon 210, respectively. Similarly, a groove region 294 can extend directly below the icon 210 and can be defined by boundaries 287 and 286 that, again, can be extensions of the leftmost and rightmost boundaries of the icon 210, respectively. Additional groove regions 293 and 295 can be extended to the right and to the left, respectively, of the icon 210 to enable precise horizontal movement of the icon 210. The groove region 293, extending to the right of the icon 210, can be bounded by boundaries 284 and 285, that can be extensions of the topmost and the bottommost boundaries of the icon 210, respectively. Similarly, the groove region 295, extending to the left of the icon 210, can be bounded by boundaries 289 and 288, that can be extensions of the topmost and the bottommost boundaries of the icon 210, respectively.

Although the groove regions 292, 293, 294 and 295 are shown in the system 200 of FIG. 2 as having boundaries commensurate with the boundaries of the icon 210, the user input interpretation mechanisms described are not limited by specifically sized groove regions and can, instead, establish groove regions of any width or length within which it can be appropriate to conclude that a user is attempting to move one or more user interface elements in a precisely linear manner. Similarly, the groove regions 292, 293, 294 and 295 shown in the system 200 of FIG. 2 are merely intended to be exemplary as far as their orientation with respect to the icon 210. While one embodiment contemplates that groove regions can extend horizontally and vertically to aid the user in precisely moving user interface elements in a horizontal or vertical manner, other embodiments contemplate either more or less groove regions. For example, if, instead of the icon 210, the user interface element that was being moved was a page of a document, one embodiment contemplates that groove regions 295 and 293 need not exist since the reading of such a document would likely only require precisely linear motion in a vertical direction for either scrolling down to read further, or scrolling back up to reread a particular section. As another example, if, instead of the icon 210, the user interface element that was being moved was one photograph of a series of horizontally arranged photographs, one embodiment contemplates the groove regions 292 and 294 need not exist since the viewing of horizontally arranged photographs can require precisely linear motion only in a horizontal direction. As yet another example, if the user interface elements 210 were an element in a drawing program, additional groove regions to those shown in the system 200 of FIG. 2 could be established, such as, for example, in 45° diagonals or other like angular offsets that could be practical within the context of, for example, the drawing program.

Turning back to the system 200 illustrated in FIG. 2, once the user input enters into a groove region, such as when the user input, moving along the line 215, reaches the location 261, the user input interpretation mechanisms can modify the user input that they pass along to application programs, operating systems, or other collections of computer-executable instructions such that, despite the fact that the user input at, for example, the location 261 is slightly to the right of the center of the groove region 292, the user input, as provided by the user input interpretation mechanisms, can be modified to be in the center of the groove region 292. As a result, the application programs, operating systems, or other collections of computer executable instructions that are receiving such input can render the appropriate user interface elements in a precisely linear relationship to their original location. Thus, for example, as shown in the system 200 of FIG. 2, even though the user's input, at the location 261, is not directly above the original location of the icon 210, the modified user input, as provided by the user input interpretation mechanisms, can cause the application program, or operating system, drawing the grayed-out icon 262 to draw such an icon in a precisely linear relationship to the original icon 210, namely, in the example illustrated, precisely above the original icon 210.

As indicated previously, a groove region can mimic a physical groove and define a region within which user input remains confined to a precise path despite variations, much in the same way a wheel of a vehicle, for example, remains confined to a groove that it has fallen into despite minor variations in travel to either side. Thus, as shown in the system 200 of FIG. 2, if the user input, proceeding along the line 215 from the location 261 to the location 271, deviates slightly in the horizontal direction, the motion of the corresponding user interface element, namely the icon 210 in the example illustrated in FIG. 2, can remain moving in an undeviating, vertical direction since the user input that is passed on by the user input interpretation mechanisms can be slightly modified from the actual user input that is represented by the line 215 and that includes the slight deviations. For example, the user input at the location 271 can have deviated slightly to the right from the user input at the location 261. Nevertheless, the grayed out icon 272 can remain aligned with the grayed-out icon 262 and can represent a precise vertical movement of the icon 210 from its original location. Thus, while the user input at the location 271 can have traditionally caused the rendering of an icon in the location 270, modifications provided by the user input interpretation mechanisms can, instead, cause the user input that is received by the application program or operating system rendering the icons to be modified such that that application program or operating system believes that the user input is centered on the groove region 292 and, as a result, generates the grayed-out icon 272 to the left of the actual user input at location 271. As the user input proceeds along the line 215 in a generally upward direction, these slight horizontal deviations in the user input, such as illustrated by the relative horizontal position of the location 271 as compared to the location 261, can be eliminated by the user input interpretation mechanisms which can, instead, modify the user input so that it is confined to the groove region 292, and enables the user to, for example, drag the icon 210 in a precise vertical manner.

As can be seen, therefore, the freeform movement threshold of 280 can define a freeform movement region 291 around a user interface element such that initial user input can be passed through without modification and, thus, without delay, while subsequent user input can be analyzed to determine whether such input falls within freeform regions or groove regions that can be established to aid the user in performing precise linear movement in relevant directions. In such a manner, the user input interpretation mechanisms can aid the user in performing precise linear movements, while simultaneously avoiding the introduction of an initial delay. By contrast, typical user input interpretation mechanisms that first wait to determine whether the user seeks to perform precise linear movement introduce an initial delay in passing along the user's input since they must wait for sufficient user input from which to glean the user's intentions.

Figure 3:
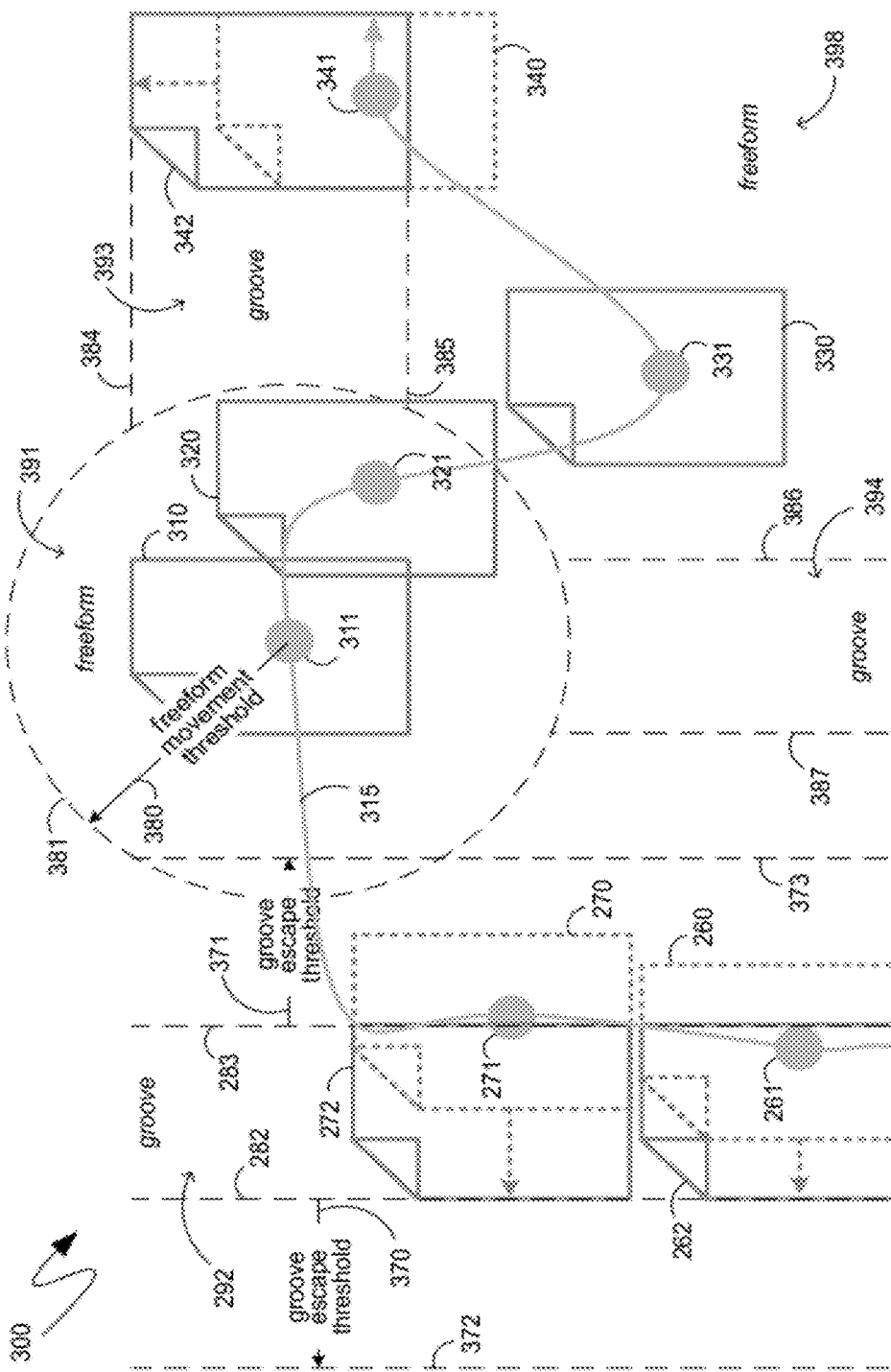
FIG. 3 is a block diagram of a visualization of another aspect of an operation of an exemplary input interpretation mechanism.

Turning to FIG. 3, the system 300 shown therein illustrates an exemplary mechanism, according to one embodiment, by which continued user input can reveal an intention, by the user, to return to unaided, freeform movement, even after the user's inputs have been found to evidence an intention, by the user, to be limited to precise linear movements, and even after the user input, as passed along by the user input interpretation mechanisms, has been constrained to a groove region, such as the groove region 292. To illustrate such an embodiment, the system 300 of FIG. 3 comprises a line 315 that can represent user input continued from the line 215 shown previously in the system 200 of FIG. 2, and described in detail above. As described previously, and as shown in the system 300 of FIG. 3, the user input moving along between the locations 261 and 271 can be interpreted as indicating a desire to move the icon 210, shown previously in FIG. 2, in a precisely linear manner, and, as such, the user input can be modified by the user input interpretation mechanisms such that the user input that is passed through can be in the center of the groove region 292. Thus, as shown in the system 300 of FIG. 3, the icon 210, shown previously in FIG. 2, is moved in a precisely vertical manner, as indicated by the grayed-out icons 262 and 272, within the groove region 292. As also described previously, the user input interpretation mechanisms can interpret user input in the vicinity of the groove region 292 as evidencing an intention to move one or more user interface elements in a precisely vertical manner and, as such, can pass through modified user input that can be in the center of the groove region 292 despite horizontal variances in the actual user input being provided, such as is indicated by the line 315 and the locations 261 and 271 shown in the system 300 of FIG. 3.

However, in one embodiment, if a user's input moves beyond a groove escape threshold, then the user input interpretation mechanisms can no longer modify the user's input to confine it to the groove region, and can, instead, revert back to interpreting the user's input in a freeform manner. A groove escape threshold can be established as a distance beyond the limits of a groove region, such as the limits of 282 and 283 of the groove region 292, beyond which continued user input evidences a desire to escape the groove region and return to freeform movement. Thus, as shown in the system 300 of FIG. 3, a groove escape threshold 370 can establish a limit 372 beyond which continued user input can evidence a desire to escape the groove region 292 and return to freeform movement. Similarly, a groove escape threshold 371 can establish a limit 373 beyond which continued user input can, likewise, evidence a desire to escape the groove region 292 and return to freeform movement. The groove escape threshold 370 is assigned a different number than the groove escape threshold 371 to indicate that, in one embodiment, such escape thresholds can be established independently of one another. Thus, for example, if a groove was established near the edge of a screen, the groove escape threshold in the direction of the edge of the screen could be substantially smaller, or even zero, while the groove escape threshold in the opposite direction could be larger.

In another embodiment, rather than establishing the groove escape threshold as a distance beyond the limits of the groove region, such as is illustrated in the system 300 of FIG. 3, the groove escape threshold can be established with reference to a velocity vector that quantifies how "hard" a user moves their input in a direction orthogonal to the groove region, rather than how far away from the groove region the user moves their input. Utilizing such an embodiment can limit returning to freeform movement when the user did not intend to do so, such as in situations where the user intended to pan in, for example, a vertical direction for an extended period of time, but, during such an extended period, the user's input continued to slide in a horizontal manner and, thereby, eventually exceed a groove escape threshold that was based only on distance from a groove. Since such sliding of the user input in a horizontal direction, in the present example, can be relatively minor, a corresponding velocity vector would, likewise, be relatively small and, as such, would not exceed a groove escape threshold determined with reference to such velocity vectors and would, instead, enable the user to continue to pan for a greater period of time while still constrained to a groove.

Returning to the specific example illustrated by the system 300 of FIG. 3, as indicated by the line 315 in the system 300, the user input, in the illustrated example, can proceed from the location 271 in a direction substantially orthogonal to the groove region 292 and arrive at the location 311. Such a motion, with the user input proceeding beyond the groove escape threshold boundary 373, can cause the user input interpretation mechanisms to no longer modify the user input, and, instead, interpret such input as the freeform input. Thus, as illustrated by the grayed-out icon 310, the user input at the location 311 is passed along, by the user input interpretation mechanisms, in an unmodified manner and, as a result, the grayed out icon 310 is centered on the location 311 at which the user input was actually received.

In one embodiment, when the user input passes a groove escape threshold boundary a new freeform region can be established around an appropriate location, such as at the location that the user input passed the groove escape threshold boundary, or another more suitable location. For purposes of illustration, a new freeform region 391 is shown in the system 300 of FIG. 3 as being established by a freeform movement threshold of 380 around the location 311. In one embodiment, the freeform movement threshold 380 that is utilized to establish the freeform region 391 can be the same as the freeform movement threshold 280, shown in FIG. 2, that was described previously. In another embodiment, the freeform movement threshold 380 can be established independently of the freeform movement threshold 280, shown in FIG. 2, and can be either larger or smaller than the freeform movement threshold 280.

Beyond the freeform region of 391, additional groove regions, such as the groove regions 393 and 394 can be established between boundaries 384 and 385, and 386 and 387, respectively, such as in the manner described in detail above. Additionally, as also described in detail above, regions outside of the groove regions, such as the groove regions 393 and 394, can remain freeform regions, such as the freeform region 398. Thus, as shown in the system 300 of FIG. 3, if the user input proceeds along the line 315 from the location 311 to the location 321, the user input interpretation mechanisms can interpret such input as freeform input, due, at least in part, to the fact that it remains within the freeform region 391, and can, as a result, pass it along unmodified to application programs or operating systems, which can then render the grayed-out icon 320 in accordance with the user input provided to them, namely the unmodified user input, and, as result, render the grayed-out icon 320 centered around the location 321 of the actual user input. In a similar manner, as the user input proceeds along the line 315 from the location 321 to the location 331, the user input interpretation mechanisms can interpret such input as freeform input, because, again, such user input can be within a freeform region, namely the freeform region 398. Consequently, the user input interpretation mechanisms can pass the user input along unmodified, which, again, can cause the grayed-out icon 330 to be centered around location 331 of the actual user input.

However, as before, if the user input enters a groove region, such as, as shown in the system 300 of FIG. 3, when the user input proceeds along the line 315 from the location 331 to the location 341, then the user input interpretation mechanisms can modify the user input to aid the user in moving in a precise linear manner. Thus, as shown, despite the fact that the user input is at the location 341, and would, if passed along unmodified, result in a grayed-out icon in the location 340, the grayed-out icon 342 is actually displayed in a location offset upwards to align with the original location of the icon 310 with which the groove region 393 is aligned. Thus, the user input interpretation mechanisms can have modified the user input received at the location 341 to a different location centered in the groove region 393, thereby causing the application program, or operating system, receiving such input to render the grayed-out icon 342 in the location shown.

In one embodiment, in addition to, or as an alternative to, referencing the location of the user's input in regards to regions, such as the freeform regions and the groove regions described above, the history of the user's input can likewise be considered by the user input interpretation of mechanisms when determining whether to, for example, modify the user's input in accordance with the groove region, or, alternatively, whether the user's input is evidencing a desire to escape the groove region and return to freeform movement. For example, in such an embodiment, user input along the line 315 from the location 331 to the location 341 may not have necessarily caused the user input interpretation mechanisms to modify the user input, at the location 341, in accordance with the groove region 393 since the history of the user's input, as shown by the line 315, does not sufficiently evidence an intention, by the user, to move in any precisely linear manner. Instead, in such an embodiment, the user's input can be modified in accordance with the groove region 393 when the user's input continues along the line 315 in a manner substantially parallel to, and in line with, the groove region 393, such as illustrated by the arrow on the end of the line 315. Similarly, in such an embodiment, user input along the line 315 from the location 271 to the location 311 can evidence a desire to escape the groove region 292 not simply because the user's input passes the groove escape threshold boundary 373, but also because the user's input, as illustrated by the line 315, moves in the direction substantially orthogonal to the groove region 292.

Figure 4:
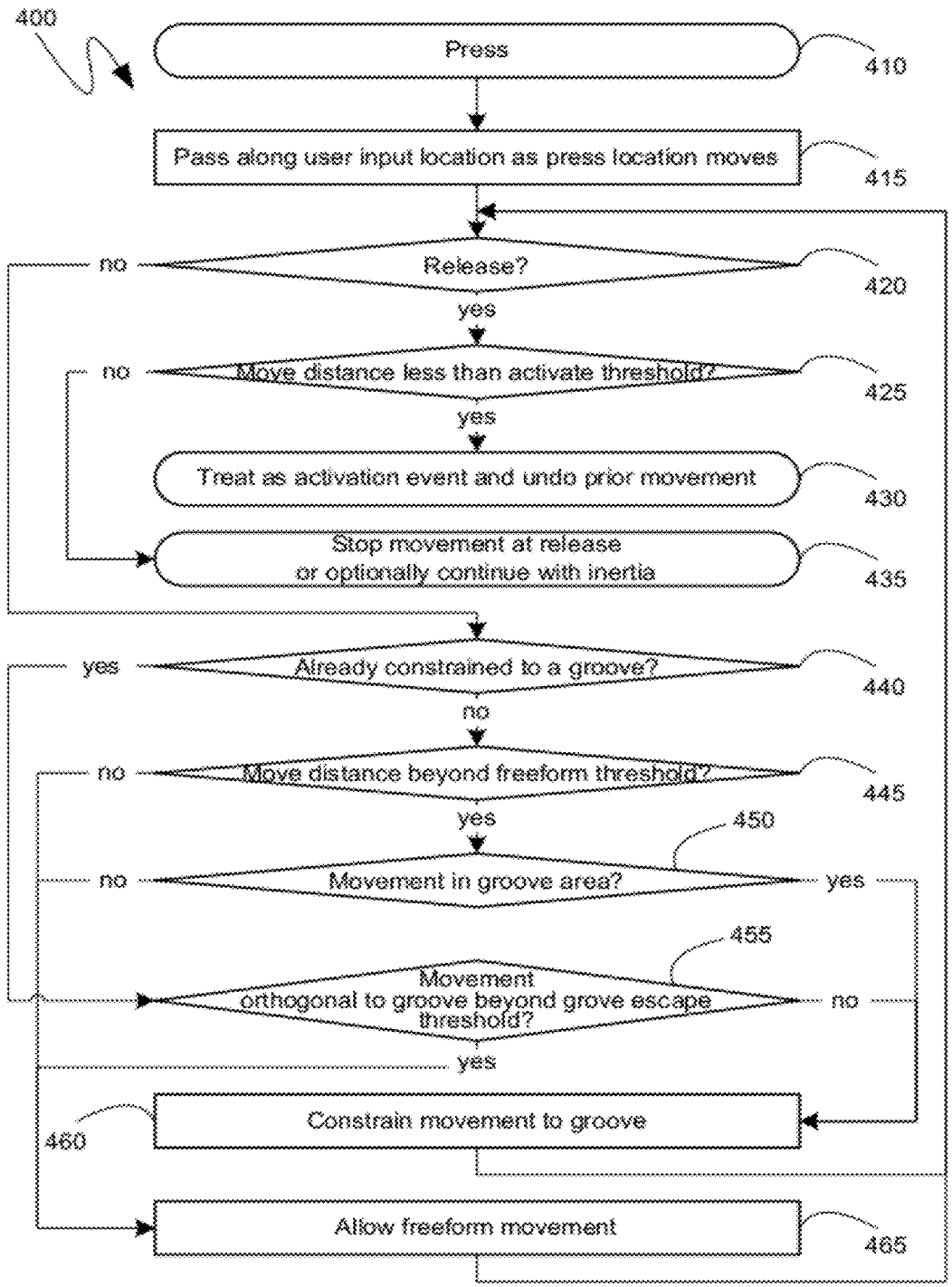
FIG. 4 is a flow diagram of an exemplary input interpretation mechanism.

Turning to FIG. 4, the flow diagram 400 shown therein illustrates an exemplary series of steps that can be performed by the user input interpretation mechanisms described in detail above. Initially, as illustrated by the step 410, an initial user input can be received. As indicated previously, for the sake of descriptive simplicity and ease of understanding the descriptions provided have been in the context of a typical touchscreen device with which a user can interact by, for example, utilizing one or more fingers to provide input to such a device. Within that exemplary context, the initial user input received at step 410 can, for example, be a press of the user's finger onto a certain point on the touchscreen. Subsequently, at step 415, the user input interpretation mechanisms can pass along the location of the user input as the location on which the user is pressing moves. As indicated previously, that passing along of the user input, at step 415, can occur without delay since the user input interpretation mechanisms need not wait, prior to step 415, for some threshold amount of user input from which to derive the user's intentions.

At step 420, a determination can be made as to whether the user has ceased making input. Again, within the specific example of a touchscreen, utilized for purposes of descriptive clarity and simplicity, the ceasing of the user's input can be in the form of a release of the pressure being applied by, for example, the user's finger onto the touchscreen device. If, at step 420, such a release is detected, a subsequent determination can be made at step 425 as to whether the distance that the user input moved, or, more accurately, as to whether the difference between the location at which the user input commenced, and the location at which the user input ended, in addition to the total distance covered by any movement of the user input location, was less than an activate threshold. As will be recognized by those skilled in the art, in certain circumstances, although there may be some minor movement of the location of the user input, the user's intention was not to move any one or more user interface elements, but rather the user's intention was to perform an activation on one of those elements, such as would traditionally have been performed by the ubiquitous mouse click. Within the context of the exemplary touchscreen device, such an activation action can be performed by the user by pressing down, for example, with their finger on the touch screen device and then releasing that pressure and removing their finger. Because the user input interpretation mechanisms can pass along the user input, such as at step 415, without delay, the user input interpretation mechanisms may pass along movement in the user input when the user, actually, only intended to press their finger down in a specific location and then release it to perform an activation event at that location. In such a case, at step 425, a determination can be made with regards to activate threshold that can be defined as a sufficiently small amount of movement such that any movement of less than that amount was likely not intended to be movement, but rather was intended to be an activation event by the user.

If, at step 425, it is determined that the distance that the location of the user input moved between the press event at step 410 and the release event at step 420 was less than the activate threshold, then the user input interpretation mechanisms can, at step 430, manufacture a sufficient amount of user input to undo any prior user input movements that they may have passed along. Additionally, at step 430, the user input interpretation mechanisms can treat the user's input and activation event and can pass that activation event along to application programs, operating systems, or other collections of computer-executable instructions.

As will be recognized by those skilled in the art, by passing along the users input, such as at step 415, without delay, the user input interpretation mechanisms described can, in one embodiment, need to undo any such movement should it later become apparent, such as by the determination at step 425, that the user intended an activation event, instead of a move event. In such a case, the additional user input manufactured by such user input interpretation mechanisms to undo the prior movement, as part of the user input that was passed along at step 415, can result in, visually, a user interface element moving slightly and then returning to its original location prior to the activation event that the user actually intended. While some users may find such movement, when activation event was intended, to be distracting, such movement can be helpful to other users because it can provide a visual indication that the user interface element is movable. In another embodiment, however, the provided user input need not be undone, and step 430 can comprise only the user input interpretation mechanisms passing along an activation event.

Returning to step 425, if the determination at step 425 reveals that the movement of the user input location has exceeded that of the activation threshold, then the user input interpretation mechanisms can, with the release that was detected at step 420, pass along an indication that the user input movement has ceased at step 435. Optionally, the user input interpretation mechanisms can manufacture additional user input to simulate inertia in the graphical user interface elements being affected by the user input. For example, such inertia can be simulated by manufacturing additional user input that, rather than instantaneously stopping the movement of a user interface element, instead slows such movement down to a stop over a distance.

Returning back to step 420, if no release is detected at step 420, processing can proceed to step 440 at which point a determination can be made as to whether the user's input has already been constrained to a groove. If the user's input has already been constrained to a groove, such as can be determined at step 440, processing can proceed to step 455 at which point a determination can be made as to whether the user's input has evidenced movement that is orthogonal to the groove, is beyond a groove escape threshold, or commendation thereof. If, at step 455, it is determined that the user's input does not evidence that the user seeks to leave the groove, then the user's input can continue to be constrained to the groove at step 460 and the user's input can be passed along in a modified manner, such that minor variations in the user's input can be eliminated and the user's input can remain constrained to the groove. Processing can then return to step 420. Conversely, if, at step 455, it is determined that the user's input does evidence that the user seeks to leave the groove, then processing can proceed to step 465 at which point freeform movement can be allowed and the user's input can be passed along in an unmodified manner.

If, at step 440, it is determined that the user's input is not already constrained to a groove, then processing can proceed with step 445, at which point a determination can be made as to whether the user's input has moved beyond a freeform threshold. If, at step 445, it is determined that the user's input has not moved beyond the freeform threshold, then the user's input can continue to be passed along in an unmodified manner, as indicated by the allowance of freeform movement at step 465. Processing can then return to step 420. Conversely, if, at step 445, it is determined that the user's input has moved beyond the freeform threshold, then, at step 450, a further determination can be made as to whether the user's input evidence is a desire to move in a precisely linear manner, such as, for example, if the user's input is proximate to a groove area, is proceeding in a direction substantially in line with the groove area, or any combination thereof. If, at step 450, it is determined that the user's input does not evidence of a desire to move in a precise linear manner, then the user input interpretation mechanisms can continue to pass along the user's input in an unmodified manner and can continue to allow freeform movement, at step 465, and processing can return to step 420. Conversely, if, at step 450, it is determined that the user's input evidence is a desire to move in a precise linear manner, then the user input interpretation mechanisms can modify the user's input so as to constrain the user's input to a groove, as indicated at step 460. As before, processing can then return to step 420, at which point the determination of whether the user's input has ended can, again, be made.

Figure 5:
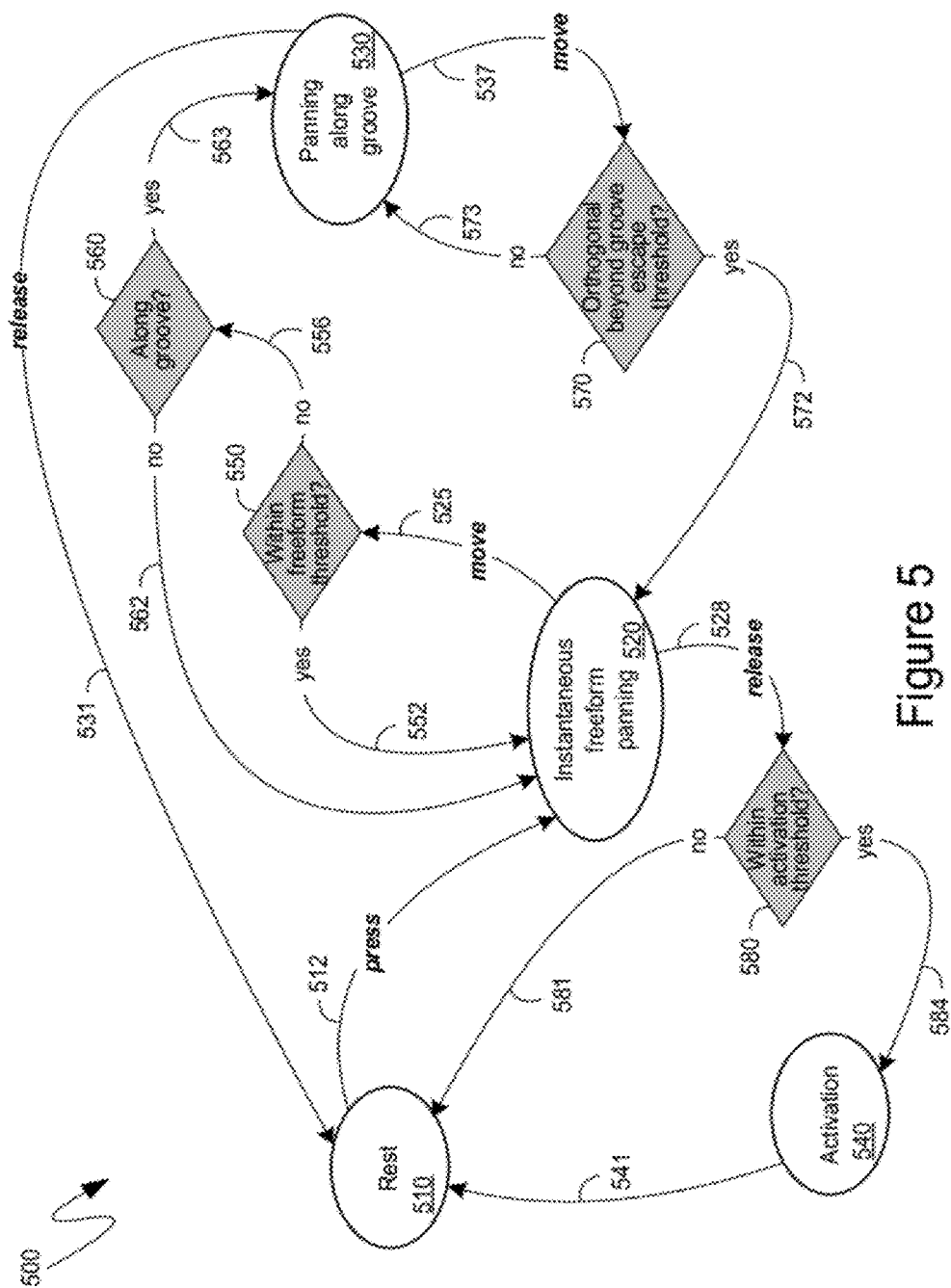
FIG. 5 is a state diagram of an exemplary input interpretation mechanism.

To further describe aspects of the user input interpretation mechanisms contemplated, a state diagram 500, illustrating exemplary states of the user input interpretation mechanisms, is shown in FIG. 5. Initially, as shown by the state diagram 500 of FIG. 5, the user input interpretation mechanisms can be in a rest state 510. Upon the commencement of user input, such as a press on a touchscreen, the user input interpretation mechanisms can transition to an instantaneous freeform panning state 520, as illustrated by the transition 512 triggered by such an initiation of user input. At the instantaneous freeform panning state 520, the user input interpretation mechanisms can pass along the users input in an unmodified manner and can do so without delay. If, while the user input interpretation mechanisms are in the instantaneous freeform panning state 520, the user input ends, such as is indicated by the release event of the transition 528, the user input interpretation mechanisms can transition either back to the rest state 510, as illustrated by the transitions 528 and 581, or they can transition to an activation state 540, as illustrated by the transitions 528 and 584. The determination of whether the user input interpretation mechanisms transition back to the rest state 510 or the activation state 540 can be informed by the determination 580 as to whether the user input had moved beyond an activation threshold. If such an activation threshold was exceeded, then the user input interpretation mechanisms can transition back to the rest state 510, as illustrated by the transition 581, optionally with additional user input manufactured by the user input interpretation mechanisms to simulate inertia of one or more user interface elements. Conversely, if the activation threshold was not exceeded, then the user input interpretation mechanisms can transition to the activation state 540, as illustrated by the transition 584. At the activation state 540 the user input interpretation mechanisms can pass along an activation event and can, optionally, undo any movement that may have been passed along while they were operating in the instantaneous freeform panning state 520. Subsequently, as indicated by the transition 541, the user input interpretation mechanisms can return to the rest state 510.

While in the instantaneous freeform panning state 520, if the user input moves, as indicated by the transition 525, the user input interpretation mechanisms can either return to the instantaneous freeform panning state 520, within which they would pass along that change of user input location in an unmodified manner, or the user input interpretation mechanisms could transition to the panning along a groove state 530, within which they would modify the user input, prior to passing it along, such that the modified user input would be precisely within the groove and would enable the user to perform precise linear movements. The determination of whether the user input interpretation mechanism's return to the instantaneous freeform panning state 520, or transition to the panning along a groove state 530 can be informed by the decisions 550 and 560. At the decision 550, a determination can be made as to whether the movement of the user's input was within a freeform threshold. If the user's input remains within the freeform threshold, as determined by the decision 550, then the user input interpretation mechanisms can transition back to the instantaneous freeform panning state 520, as illustrated by the transition 552. Conversely, if the decision 550 indicates that the movement of the user's input is beyond the freeform threshold a further decision 560 can be made, as illustrated by the transition 556.

At the decision 560, a determination can be made as to whether the user's input movement evidence is a desire to move in a precisely linear manner. If, at the decision 560, it is determined that the user's input does not evidence the desire to move in a precisely linear manner, then the user input interpretation mechanisms can transition back to the instantaneous freeform panning state 520, as illustrated by the transition 562. If, however, at the decision 560, it is determined that the user's input does evidence a desire to move in a precisely linear manner, then the user input interpretation mechanisms can transition to the panning along a groove state 530, as illustrated by the transition 563.

While in the panning along a groove state 530, if the user input interpretation mechanisms detected that the user input has ceased, they can transition back to the rest state 510 as illustrated by the transition 531. Conversely, if the user input interpretation mechanisms detect further movement of the user's input, as illustrated by the transition 537, they can either transition back to the instantaneous freeform panning state 520, or return to the panning along a groove state 530. Which state the user input interpretation of mechanisms returned to can be informed by a determination 570, which can determine whether the user input moved beyond a groove escape threshold, such as in an orthogonal manner. If the determination 570 determines that the user input did move beyond the groove escape threshold, then the user input interpretation mechanisms can return to the instantaneous freeform panning state 520, as illustrated by the transition 572, and can cease modifying the user input to align it along the groove. Conversely, if the determination 570 determines that the user input did not move beyond the groove escape threshold, or otherwise did not evidence of desire to move in a freeform manner, the user input interpretation mechanisms can return to the panning along the groove state 530, as illustrated by the transition 573, and can continue to pass along modified user input that is modified to align it with the groove.

As can be seen from the above descriptions, mechanisms for interpreting user input without introducing a delay in the passing along of such user input have been enumerated. In view of the many possible variations of the subject matter described herein, we claim as our invention all such embodiments as may come within the scope of the following claims and equivalents thereto.

We claim:

1. One or more computer-readable memory comprising computer-executable instructions for interpreting user input, the computer-executable instructions directed to steps comprising:
    receiving moving user input, the moving user input having commenced from an origin point;
    passing along the moving user input, as it is received, in an unmodified form while the user input remains within a freeform movement threshold distance away from the origin point; and
    passing along a modified user input in response to the moving user input having moved beyond the freeform movement threshold distance away from the origin point and into a groove region, wherein the modified user input is modified to center the moving user input along the groove region.

2. The computer-readable memory of claim 1, comprising further computer-executable instructions for again passing along the moving user input in the unmodified form, after the passing along of the modified user input, in response to the moving user input having subsequently moved orthogonally to the groove region beyond a groove escape threshold boundary.

3. The computer-readable memory of claim 2, comprising further computer-executable instructions for passing along again-modified user input in response to the moving user input having subsequently moved beyond a second freeform movement threshold distance away from a point at which the moving user input moved beyond the groove escape threshold boundary and into a second groove region, wherein the again modified user input is modified to center the moving user input along the second groove region.

4. The computer-readable memory of claim 1, wherein the groove region is a pre-defined linear region located in alignment with the origin point.

5. The computer-readable memory of claim 1, comprising further computer-executable instructions for: determining that the moving user input is substantially directed along a direction; and establishing the groove region as a linear region aligned in the direction and located at a location of the moving user input when the computer-executable instructions determined that the moving user input was substantially directed along the direction.

6. The computer-readable memory of claim 1, comprising further computer-executable instructions for passing along an activation event at the origin point in response to the moving user input not exceeding an activation threshold prior to being ended by the user.

7. The computer-readable memory of claim 6, comprising further computer-executable instructions for generating, in response to the moving user input not exceeding an activation threshold prior to being ended by the user, user input to undo the moving user input that was passed along.

8. The computer-readable memory of claim 1, wherein the computer-executable instructions for passing along the modified user input are executed only in response to: the moving user input having moved beyond the freeform movement threshold distance away from the origin point, and the moving user input having subsequently moved into the groove region; wherein immediately preceding positions of the moving user input are substantially along a direction of the groove region.

9. A method of interpreting, on a computing device, user input to the computing device, the method comprising the steps of:
    receiving, at the computing device, moving user input provided by a user through user interface input hardware that is communicationally coupled to the computing device, the moving user input having commenced from an origin point;
    passing along, to processes executing on the computing device, the moving user input, as it is received, in an unmodified form while the user input remains within a freeform movement threshold distance away from the origin point; and
    , to the processes executing on the computing device, a modified user input in response to the moving user input having moved beyond the freeform movement threshold distance away from the origin point and into a groove region, wherein the modified user input is modified to center the moving user input along the groove region.

10. The method of claim 9, further comprising the steps of: again passing along, to the processes executing on the computing device, the moving user input in the unmodified form, after the passing along of the modified user input, in response to the moving user input having subsequently moved orthogonally to the groove region beyond a groove escape threshold boundary.

11. The method of claim 10, further comprising the steps of: passing along, to the processes executing on the computing device, again-modified user input in response to the moving user input having subsequently moved beyond a second freeform movement threshold distance away from a point at which the moving user input moved beyond the groove escape threshold boundary and into a second groove region, wherein the again modified user input is modified to center the moving user input along the second groove region.

12. The method of claim 9, wherein the groove region is a pre-defined linear region located in alignment with the origin point.

13. The method of claim 9, further comprising the steps of:
    determining that the moving user input is substantially directed along a direction; and
    establishing the groove region as a linear region aligned in the direction and located at a location of the moving user input when the computer-executable instructions determined that the moving user input was substantially directed along the direction.

14. The method of claim 9, further comprising the steps of passing along, to the processes executing on the computing device, an activation event at the origin point in response to the moving user input not exceeding an activation threshold prior to being ended by the user.

15. The method of claim 14, further comprising the steps of generating, on the computing device, in response to the moving user input not exceeding an activation threshold prior to being ended by the user, user input to undo the moving user input that was passed along.

16. The method of claim 9, further comprising the steps of passing along, to the processes executing on the computing device, the modified user input only in response to: the moving user input having moved beyond the freeform movement threshold distance away from the origin point, and the moving user input having subsequently moved into the groove region; wherein immediately preceding positions of the moving user input are substantially along a direction of the groove region.

17. A computing device comprising a user input peripheral; one or more processing units; and one or more computer-readable media comprising computer-executable instructions that, when executed by the one or more processing units, perform steps comprising:
    receiving moving user input from the user input peripheral, the moving user input having commenced from an origin point;
    passing along the moving user input, as it is received from the user input peripheral, in an unmodified form while the user input remains within a freeform movement threshold distance away from the origin point; and
    passing along a modified user input in response to the moving user input having moved beyond the freeform movement threshold distance away from the origin point and into a groove region, wherein the modified user input is modified to center the moving user input along the groove region.

18. The computing device of claim 17, wherein the user input peripheral is a touchscreen, and wherein further the moving user input is received when a user presses and drags at least one finger on the touchscreen.

19. The computing device of claim 18, wherein the touchscreen is utilized to both enable the user to input the moving user input and, simultaneously, to display, to the user, one or more graphical user interface elements whose display is controlled, at least in part, by the moving user input passed along by the execution of the computer-executable instructions.

20. The computing device of claim 17, wherein the user input peripheral is a video camera, and wherein further the moving user input is received when a user performs pre-defined motions that are captured by the video camera.

* * * * *